Dec. 28, 1943. W. HOGENSON 2,337,605
APPARATUS FOR AND METHOD OF PREPARING FUSED MATERIALS
Filed Dec. 22, 1941 3 Sheets-Sheet 1

Dec. 28, 1943.   W. HOGENSON   2,337,605
APPARATUS FOR AND METHOD OF PREPARING FUSED MATERIALS
Filed Dec. 22, 1941   3 Sheets-Sheet 3

Inventor
William Hogenson
by Charles H. Hill
Attys.

Patented Dec. 28, 1943

2,337,605

UNITED STATES PATENT OFFICE 2,337,605

APPARATUS FOR AND METHOD OF PREPARING FUSED MATERIALS

William Hogenson, Hinsdale, Ill., assignor to Chicago Vitreous Enamel Products Co., Cicero, Ill., a corporation of Illinois Application December 22, 1941, Serial No. 423,880

16 Claims. (Cl. 49—53)

This invention relates to an apparatus for and a method of preparing fused materials. More particularly, the invention pertains to an apparatus and a method for the continuous manufacture of enamels, such as vitreous enamel or porcelain enamel, and various kinds of glass, or similar materials.

In the manufacture of vitreous and porcelain enamels, glass and the like, various refractory materials such as quartz or other forms of silica are heated together with fluxing agents, opacifying agents and the like to form a fused mass. In the case of enamels, this fused mass is quenched in water to produce a finely divided solid product. For satisfactory results, this fused mass should be completely melted and thoroughly mixed, in other words, should be homogeneous in reference both to its physical state and its chemical composition. Such homogeneity is not easily effected even in the case of carefully premixed comminuted enamel-forming material, for in the necessarily gradual fusion of a pile of such enamel-forming material the low melting ingredients, in particular, the fluxes, tend to melt first and to drain downward. When enough material has been melted to form a liquefied layer at the bottom, the highest melting, still solid material will float on top of the molten material. Complete fusion and subsequent mixing are therefore required to prepare a homogeneous melt.

The present invention provides means and methods for continuously melting enamel-forming material and thereafter mixing the molten material including a plurality of perforate beds arranged in tandem relationship for receiving, in sequence, batches of enamel-forming material which, when resting on said beds, are exposed to flames or hot gases generated above and below said beds. The melted material is allowed to trickle through the perforate beds, dropping onto the sloping floors of parallel elongate chambers disposed side by side below said beds. The streams of molten material flowing along these chambers are allowed to join, the resulting joint stream preferably being baffled repeatedly, whereby sufficient mixing of actually molten material is effected. The mixed stream is finally skimmed to remove any floating incompletely fused material. The beds being charged in sequence, a flow from at least one bed is always obtained, so that continuous operation can be carried out.

It is therefore an important object of the present invention to provide means and methods for continuously preparing homogeneous molten enamel-forming material.

A specific object of the invention is to provide a furnace for continuously preparing molten enamel-forming material, including a series of perforate fusion arches for receiving charges of the material in rotation, chambers having sloping floors onto which fused material drops from said arches and becomes mixed in flowing over said floors, and a skimming device for holding back incompletely fused material to insure that only thoroughly fused, homogeneous material is delivered from said furnace.

Other and further objects and features of this invention will become apparent from the following description and accompanying claims taken in conjunction with the appended drawings, in which:

Figure 4 is a transverse vertical cross section taken along the line IV—IV of Figure 2.

Figure 6 is a fragmentary enlarged longitudinal vertical cross section taken along the line VI—VI of Figure 1.

As shown on the drawings:

Figure 1:
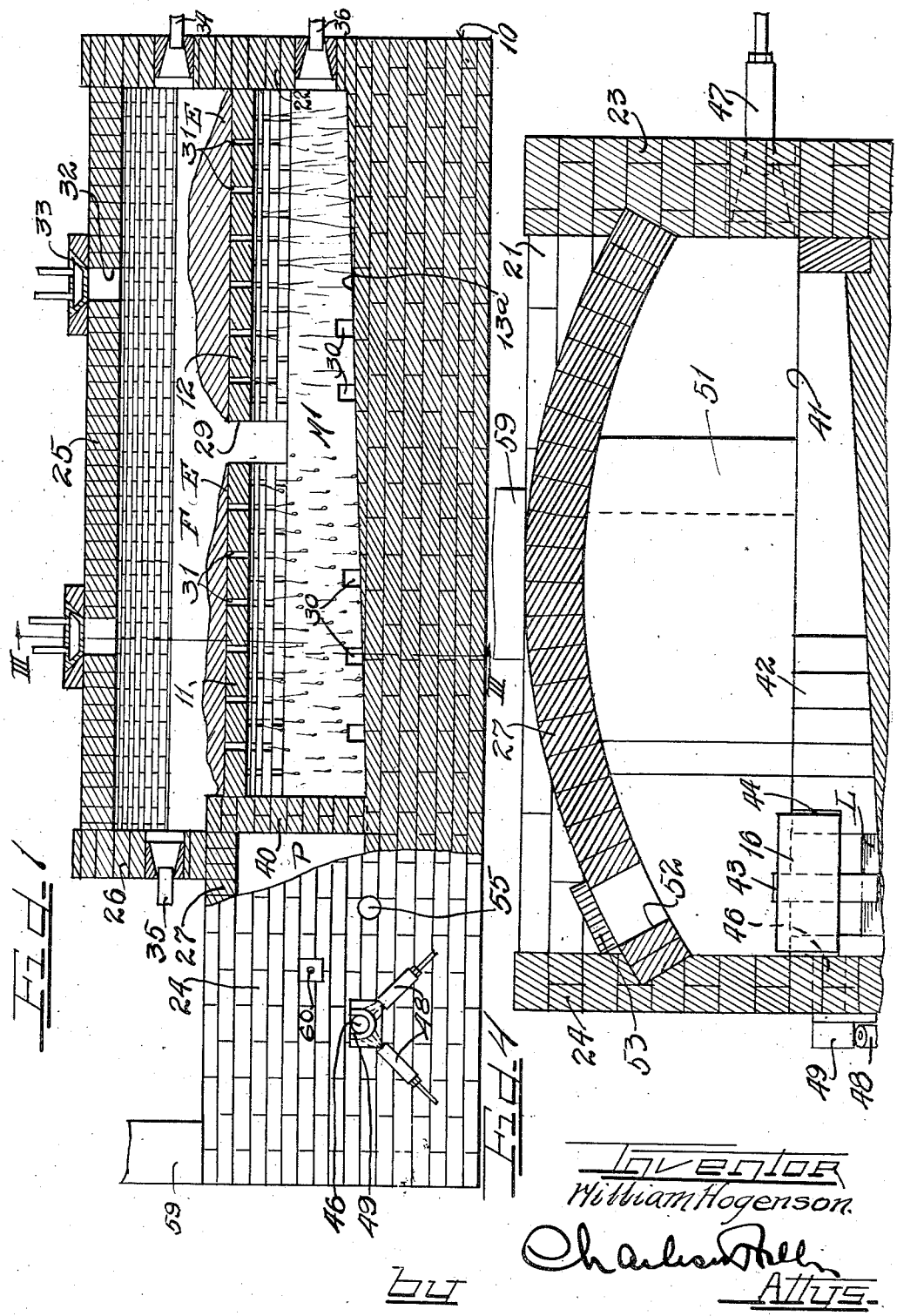
Figure 1 is a side view of a furnace according to the present invention, with parts shown in longitudinal vertical section along the line I—I of Figure 3.
Figure 2:
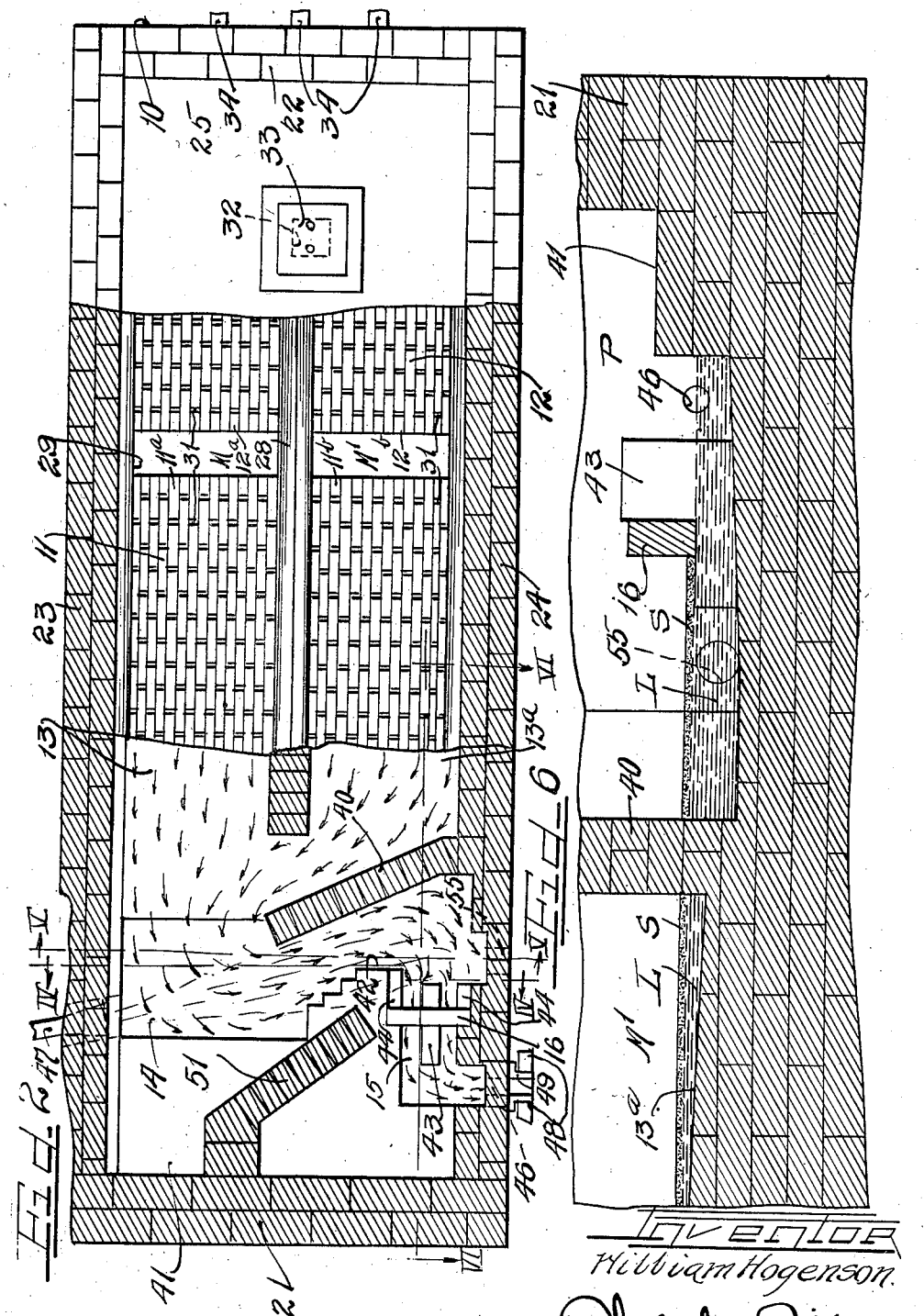
Figure 2 is a plan view of the furnace of Figure 1, with parts broken away to show the perforate fusion beds and other and further parts broken away to show the mixing and skimming elements in the furnace.

In Figures 1 and 2 the reference numeral 10 indicates generally a furnace according to the present invention for use in the manufacture of porcelain and vitreous enamels, glass and similar materials. This furnace may be suitably constructed of refractory material such as is commonly used in the construction of furnaces of this type, preferably fire brick or the like. Generally speaking, the furnace 10 may be characterized as including two separate perforate fusion beds 11 and 12 arranged in tandem relationship and two parallel elongate mixing chambers M and M₁ extending side by side below said beds 11 and 12 and having floors 13 and 13a sloping toward a common channel 14 for fused material flowing from both chambers toward a discharge conduit 15 spanned by a skimming block 16.

The furnace 10 is generally rectangular in horizontal section, being provided with end walls 21 and 22 as well as longitudinally extending sidewalls 23 and 24. The mixing chambers M and M₁ occupy a major portion of the floor space of the rectangular furnace 10, the end wall 22 and portions of the sidewalls 23 and 24 rising about the mixing chambers to a greater height than the end wall 21 at the other end of the furnace and the remainder of the sidewalls, in order to support an arched roof 25 above the fusion beds 11 and 12. A supplemental end wall 26 defines, along with the roof 25 and the top portions of the sidewalls 23 and 24 and of the end wall 22, an elongate fusion chamber F extending above the fusion beds 11 and 12. The supplemental end wall 26 is supported by an arched roof 27 on about the same level as the fusion beds 11 and 12 and covering that portion of the furnace not occupied by fusion beds and mixing chambers, which forms a puddling chamber P.

Figure 3:
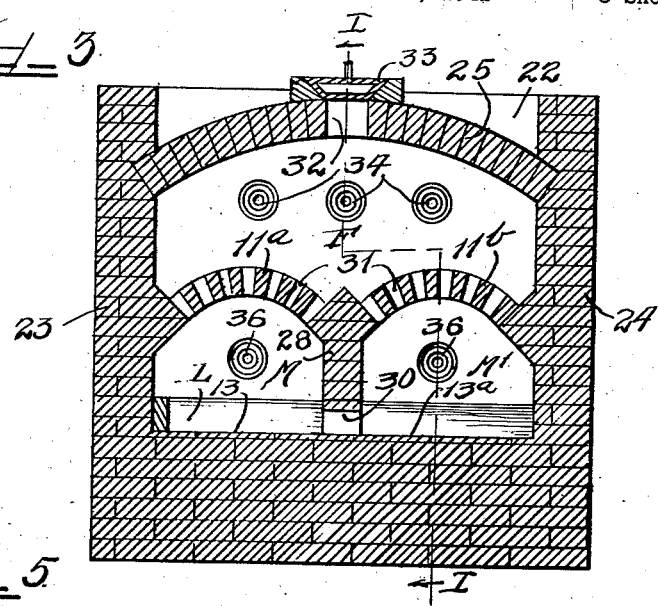
Figure 3 is a transverse vertical cross section taken along the line III—III of Figure 2.

As best shown in Figure 3, the fusion bed 11 comprises two arches 11a and 11b extending side by side in parallelism and having their outer edges supported from the sidewalls 23 and 24 while the inner edges are supported by a wall 28 extending longitudinally of the furnace approximately in the middle thereof. This wall 28 also serves as a partition between the mixing chambers M and M₁, being, however, pierced by apertures 30 establishing intercommunication between the chambers M and M₁ at the bottom thereof. The top surface of the wall 28 is wedge-shaped. The fusion bed 12 is similarly subdivided into parallel arches 12a and 12b whose inner edges are also supported by the wall 28. The arches 12a and 12b extend in parallelism from the gap 29 which separates the two fusion beds, to the end wall 22.

All the arches 11a, 11b, 12a and 12b have the bricks forming the same set so as to provide a plurality of apertures 31 therethrough arranged in regular spaced frequent intervals over their whole surfaces. Above each fusion bed is provided a charging hole 32 in the roof 25 having a water cooled stopper 33.

In the top portion of the end wall 22 are inserted three burners 34 for heating the fusion chamber F. Other burners 35 are inserted in the supplemental end wall 26, for the same purpose. One burner 36 in the lower portion of the end wall 22 is provided for each of the mixing chambers M and M₁.

As shown in Figures 1 and 2, comminuted enamel-forming material E may be charged onto the fusion beds 11 and 12 through the charging holes 32, the stoppers 33 being temporarily withdrawn. The burners 35 will fuse the enamel-forming material in the bed 11, while the burners 34 will melt the material in the bed 12. If the charging of the two beds is staggered, the bed 11, for instance, being charged some time in advance of the bed 12, the material in the bed 11 will fuse ahead of that in bed 12, as indicated in Figure 1. In such staggered charging, one bed will serve to supply molten enamel-forming material to the mixing chambers M and M₁ while the other bed is being recharged, so that at all times molten enamel-forming material will be trickling down through the apertures 31. As shown in Figure 1, molten enamel-forming material is trickling down through the apertures 31 in the fusion bed, while solid particles are sifting down from the fusion bed 12. Some melting of such solid particles is, of course, effected by the burners 36, which also serve to keep the molten material at any desired temperature.

Due to the slope of the floors 13 and 13a of the mixing chambers M and M₁, fused material L will flow away from the end wall 22 in a direction toward the end wall 21, with any materials not completely fused floating on top of the liquefied material. The chambers M and M₁ are long enough so that good mixing of the liquefied material is effected during such flow.

Figure 5:
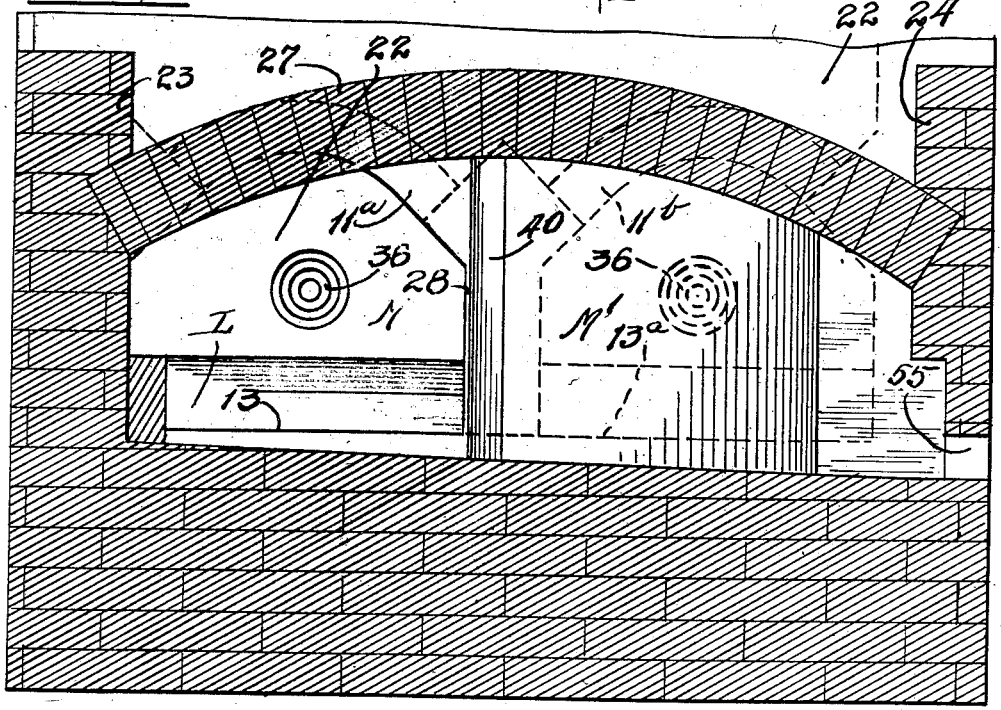
Figure 5 is a transverse vertical cross section taken along the line V—V of Figure 2.

Further mixing and removal from the flowing liquefied material of incompletely fused matter are effected in the puddling chamber P of the furnace 10, as shown in Figures 2 and 4 to 6. With particular reference to Figures 2 and 5, it will be seen that a wall 40 extends from the sidewall 24 to a point opposite the free end of the partition 28, i. e., at the lower end of the mixing chamber M₁. Said wall 40 is deflected away from the free end of the partition 28 to provide for flow of molten material therebetween. The sloping floors 13 and 13a continue outside and beyond the mixing chambers M and M₁ and drop the molten material into the puddling chamber P. The wall 40 serves as a baffle, to force the stream of fused enamel-forming material flowing from the mixing chamber M₁ to join that issuing from the chamber M. Since the stream from the mixing chamber M₁ hits the other stream at an angle, thorough intermixture is effected.

The channel 14 (Figure 2) extends transversely of the furnace 10 at the end of the floors 13 and 13a, occupying, adjacent the side wall 23, about one-half of the bottom length of the puddling chamber P. The other half of the puddling chamber bottom area is occupied by a floor 41 raised above the lowest level of the floors 13 and 13a. The channel 14 slopes toward the sidewall 24. To provide additional intermixing of fused material flowing across the furnace through the channel 14 past the free end of the wall 40, the channel is constricted to about half its previous breadth at 42, a portion of the puddling chamber floor 41 projecting with successive set-offs into the channel 14.

When the channel 14 reaches the sidewall 24, its direction is reversed at right angles, to form the discharge channel 15, wherein fused material flows along the sidewall 24 toward the end wall 21, the floor of the channel 15 sloping toward the junction with the channel 14. Discharge is effected through an aperture 46 piercing the sidewall 24, after the direction of flow has once more been reversed at right angle by the margin of the puddling chamber floor 41 extending again in parallism with the end wall 21 toward the sidewall 24. As shown in Figure 2, the stream flowing longitudinally of the furnace from the mixing chambers toward the end wall 21 has its direction of flow reversed not less than four times, whereby complete mixing is effected.

The discharge channel 15 extending in parallelism with the sidewall 24 is spanned by the skimming block 16 mentioned hereinabove which dips down into the stream of fused enamel-forming material L sufficiently to exclude any materials not completely fused. This skimming block is preferably replaceable, being supported centrally by an L-shaped block 43 set down in the middle of the channel 16 and being supported terminally by having its ends set in niches 44 in the sides of the channel, i. e., in the edge of the puddling chamber floor 41 and the sidewall 24. The skimming block 16 serves to prevent discharge of incompletely fused material S, which, being retained within the channels 14 and 15 in the bottom of the puddling chamber 14, can be melted completely by heat generated by a burner 47 set in the sidewall 23. It should be noted that the burner 47 plays on the surface of the fused material flowing through the channel 14, thus heating the incompletely fused material to the exclusion of the completely fused material.

In effect, the skimmer 16 decelerates the top layer of incompletely fused material in the channels 14 and 15 relative to the flowing bottom layer. This decelerated material is released for discharge when completely fused, being then discharged along with material drained off later from the fusion chamber that, being completely fused when drained off, has caught up with the decelerated material. The skimming device thus effects intermixing of incompletely and completely fused material drained off at different times.

Burners 48 are provided for heating material being discharged through the aperture 46 which is prolonged into a spout 49.

A wall 51 may be erected from the puddling chamber floor 41 to extend from the end wall 21 opposite the mouth of the chamber M in a direction more or less diagonal of the furnace into the constricting projection 42 of the puddling chamber floor 41, to serve as a shield against possible splattering into the channel 15.

The roof 27 may be apertured at 52, above the skimming block 16, to permit visual inspection. This aperture may be closed, for instance, with a replaceable brick 53.

A drainage aperture 55 may be provided in the sidewall 24 where the channel 14 meets said sidewall. This aperture 55 may be closed, for instance, with a clay plug, and, unlike the discharge aperture 46, is set at the bottom of the channel 14, to provide complete drainage for cleaning and other purposes. It should be noted that the floors of both the channel 14 and the channel 15 slope toward the drainage aperture 55, which therefore is disposed on a level with the lowest point accessible to fused material, whereby complete drainage is assured.

Hot gases are vented through a stack 59.

Pyrometers 60 may be provided as desired.

The above described furnace and method of continuously preparing fused enamel or the like are disclosed merely as illustrative examples of the working of the present invention. Broadly speaking, the present invention includes furnaces subdivided into fusion chambers with perforate floors disposed above mixing chambers having sloping floors for joint discharge into a repeatedly baffled channel in the floor of a puddling chamber provided with a skimming device. The methods of the present invention may be generally defined as including the steps of successively melting a plurality of batches of enamel-forming material, allowing the fused material to drain off to a lower level as the same is melted, forming the drained material into parallel streams at said lower level, joining said streams, repeatedly baffling the joint stream, and removing, by skimming, incompletely fused material, or at least retaining the incompletely fused material within the furnace for complete fusion by added heat, while discharging the molten material for quenching or other further treatment.

Many details of structure and procedure may be varied within a wide range without departing from the principles of this invention, and it is therefore not the purpose to limit the patent granted on this invention otherwise than necessitated by the scope of the appended claims.

I claim as my invention:

1. A method of continuously preparing homogeneous fused enamel-forming material which includes successively heating a plurality of batches of enamel-forming material at one level so as to fuse said material, draining off the fused material to another lower level beneath said first level as said material is fused, forming the drained fused material into a stream at said lower level with any incompletely fused material floating on top of said stream, baffling said stream to insure homogeneity, and skimming the baffled stream to hold back any floating incompletely fused material from the homogeneous material before delivery thereof.

2. A method of continuously preparing homogeneous fused enamel-forming material which includes successively heating a plurality of batches of enamel-forming material at one level so as to fuse said material gradually, draining off the fused material as formed to another lower level beneath said first level, confining said fused material into streams flowing side by side at said lower level with any incompletely fused material floating on top of said streams, flowing said streams together to form a joint stream, flowing said joint stream through a heated zone, repeatedly reversing the direction of flow of the joint stream through said heated zone, and obstructing the flow of the topmost portion of the joint stream out of said heated zone, whereby any incompletely fused material floating on top of the joint stream is retained within the heated zone.

3. A method of continuously preparing homogeneous fused enamel-forming material which includes charging a plurality of heated zones in rotation with a plurality of batches of enamel-forming material, draining off said material as the material is gradually fused in said zones to a lower level below said heated zones, forming the drained fused material into two generally parallel streams at said lower level with incompletely fused material floating on top of the flowing fused material, directing one of said streams at an angle into the path of the other stream to form a joint stream, flowing the joint stream along a crooked path through a further heated zone, and obstructing the flow of the topmost portion of the joint stream out of the last mentioned heated zone, whereby incompletely fused material floating on top of the joint stream is retained within the heated zone for complete fusion and subsequent unobstructed flow out of said heated zone along with completely fused material.

4. Apparatus for continuously preparing homogeneous fused enamel-forming material which includes means for successively heating a plurality of batches of enamel-forming material at one level to fuse said material gradually, means for draining off the fused material to another lower level beneath said first level as said material is fused, means for forming the drained fused material into a plurality of streams at said lower level with any incompletely fused material floating on top of said streams, means for joining said streams, means for repeatedly baffling the joint stream, and means for skimming the joint baffled stream to hold back from delivery any floating incompletely fused material.

5. Apparatus for continuously preparing homogeneous fused enamel-forming material which includes means for successively heating a plurality of batches of enamel-forming material so as to fuse said material gradually, means for draining the fused material to a lower level as said material is fused, means for forming the drained fused material into streams flowing side by side at said lower level with any incompletely fused material floating on top of said streams, means defining a path for the flow of said streams from below heated batches of enamel-forming material, means for directing said streams into a common path to form a joint stream, means defining a heated zone about said path, baffles in said path for changing the direction of flow of said joint stream, and means for obstructing the flow of the topmost portion of the joint stream out of said heated zone, whereby any incompletely fused material floating on top of the joint stream is retained within said heated zone.

6. Apparatus for continuously preparing homogeneous enamel-forming material which includes means forming a plurality of heated zones to be charged in rotation with a plurality of batches of enamel-forming material, means for draining off said material as the material is gradually fused in said zones to a lower level below said heated zones, means for forming the drained fused material into two generally parallel streams at said lower level with any incompletely fused material floating on top of the flowing fused material, means defining a path for the flow of said streams from below said heated zones, means for directing one of said streams at an angle into the path of the other stream to form a joint stream, means forming a heated zone and defining a crooked path for flowing the joint stream through said last mentioned heated zone, and means for obstructing the flow of the topmost portion of the joint stream out of the last mentioned heated zone, whereby incompletely fused material floating on top of the joint stream is retained within the heated zone for complete fusion and subsequent unobstructed flow out of said heated zone along with completely fused material.

7. An apparatus for continuously supplying homogeneous molten enamel-forming material or the like including a furnace having a fusion chamber, a mixing chamber below said fusion chamber, and a puddling chamber in flow communication with said mixing chamber, a perforate element separating said fusion chamber from said mixing chamber and permitting direct drainage of fused material from said fusion chamber into said mixing chamber, the floor of said mixing chamber sloping towards said puddling chamber to induce flow of drained fused material from said mixing chamber to said puddling chamber, said furnace further including a baffle at the transition from the mixing chamber to the puddling chamber to direct fused material issuing from the mixing chamber to one side of the puddling chamber, the floor of said puddling chamber providing a crooked path for flowing fused material out of said furnace, and a skimming device disposed in said puddling chamber to skim any unfused floating material from the surface of said flowing fused material before the same passes out of said furnace.

8. An apparatus for continuously supplying homogeneous molten enamel-forming material or the like including a furnace having a fusion chamber, a mixing chamber below said fusion chamber, and a puddling chamber in flow communication with said mixing chamber, a perforate element separating said fusion chamber from said mixing chamber and permitting drainage of fused material from said fusion chamber into said mixing chamber, the floor of said mixing chamber sloping towards said puddling chamber to induce flow of drained fused material from said mixing chamber to said puddling chamber, said furnace further including a baffle at the transition from the mixing chamber to the puddling chamber to direct fused material issuing from the mixing chamber to one side of the puddling chamber, the floor of said puddling chamber being locally channelled to provide a crooked path for flowing baffled fused material from that side of the puddling chamber to which it has been directed by said baffle transversely across said puddling chamber to the other side thereof and thence along the latter side and out of said furnace, and a skimming device spanning said channel where said channel runs along the last mentioned puddling chamber side.

9. An apparatus for continuously supplying homogeneous molten enamel-forming material or the like including a furnace having a fusion chamber provided with a perforate floor, a mixing chamber below said fusion chamber having a sloping floor, a puddling chamber having a channel in flow communication with said mixing chamber in the direction of slope of the mixing chamber floor, a baffle at the transition from the mixing chamber to the puddling chamber, a discharge opening through the puddling chamber wall from which said baffle extends, and a skimming block spanning said channel, whereby enamel-forming material fused in said fusion chamber, drained through the perforate floor thereof, and flowing along the sloping floor of the mixing chamber may be deflected by said baffle into the origin of said channel for flow across said puddling chamber and out of said furnace through said opening, and any incompletely fused material floating on said flowing fused material may be retained in said puddling chamber by said skimming block.

10. An apparatus for continuously supplying homogeneous molten enamel-forming material or the like including a furnace having a fusion chamber provided with a roof pierced by a plurality of charging apertures and provided with a perforate floor; a mixing chamber below said fusion chamber having a sloping floor adapted to receive fused material drained from said fusion chamber through said perforate floor; a puddling chamber in material flow communication with said mixing chamber in the direction of slope of the latter's floor, a deflector for directing fused material issuing from said mixing chamber to one side of the puddling chamber, a transverse channel for deflected fused material extending across the floor of the puddling chamber and sloping away from said one side of the puddling chamber, a furnace wall on the other side of the puddling chamber being pierced by a discharge opening connected with said channel, and a skimming element obstructing the topmost portion of said channel for retaining therein incompletely fused material floating on top of the flowing fused material, said furnace being adapted for continuous operation by charging batches of enamel-forming material through said charging apertures in sequence into said fusion chamber, so that at all times at least one such batch will be in a state of gradual fusion in said fusion chamber.

11. An apparatus for continuously supplying homogeneous molten enamel-forming material or the like including a furnace having a fusion chamber provided with a perforate floor formed by two aligned sets of paired arches extending side by side lengthwise of said chamber, the two sets of arches being separated by a transverse gap in said floor, said chamber having a roof pierced by a charging aperture above each set of arches so that the two fusion beds formed by said two sets of arches can be charged in rotation with batches of enamel-forming material; said furnace further being provided with a mixing chamber below said fusion chamber having a sloping floor adapted to receive fused material drained from said fusion chamber through said perforate floor of said fusion chamber, said mixing chamber being partitioned lengthwise by a wall supporting the inner edges of the arches forming the floor of said fusion chamber, intercommunication between the partitioned portions of said mixing chamber being provided by transverse apertures through said wall at the bottom thereof; said furnace additionally including a puddling chamber in material flow communication with said mixing chamber in the direction of the slope of the floor of the latter chamber, a baffle wall in the puddling chamber originating from one sidewall thereof and extending diagonally into said chamber so as to deflect fused material issuing from one of the partitioned portions of said mixing chamber into the path of fused material flowing out of the other partitioned portion of said mixing chamber and thus to form a joint stream, a transverse channel for the joint stream across the floor of the puddling chamber, a skimming element in said channel for retaining therein incompletely fused material, a discharge aperture in the wall of said puddling chamber for discharging completely fused material from said channel, and a burner in said puddling chamber for completely fusing incompletely fused material retained in said chamber by said skimming element.

12. An apparatus for continuously supplying homogeneous fused enamel-forming material or the like including a furnace having a fusion chamber and a mixing chamber for receiving drainage of incompletely and completely fused material from said fusion chamber, said mixing chamber having a sloping floor for flowing said fused material thereover with the incompletely fused material floating on the completely fused material, a puddling chamber in direct communication with said mixing chamber and adapted to receive continuously the fused material flowing from the mixing chamber, means for discharging the completely fused material and means for retaining the incompletely fused material until the same has been completely fused for subsequent discharge.

13. A method of continuously supplying homogeneous fused enamel-forming material or the like including continuously fusing enamel-forming material, continuously draining off the fused material, continuously forming the drained off material into a stream having completely fused material as a flowing bottom layer and incompletely fused material as a floating top layer, continuously flowing said stream into a heated zone, continuously discharging the completely fused material from said zone, retaining the incompletely fused material in said zone until completely fused, and then discharging from said zone the only there completely fused material along with material completely fused before having entered said zone.

14. A method of continuously supplying homogeneous fused enamel-forming material or the like including continuously fusing enamel-forming material, continuously draining off the fused material, continuously forming the drained off material into a stream having completely fused material as a flowing bottom layer and incompletely fused material as a floating top layer, discharging said completely fused material while restraining said top layer relative to said bottom layer being discharged and heating said top layer so as to fuse said top layer completely and discharging the completely fused top layer of material along with completely fused bottom layer material.

15. An apparatus for continuously supplying homogeneous fused enamel-forming material or the like including a furnace having a fusion chamber and a mixing chamber for receiving drainage of incompletely and completely fused material from said fusion chamber, said mixing chamber having a sloping floor for flowing said fused material thereover with the incompletely fused material floating on top of the completely fused material, said furnace further having a puddling chamber adapted to receive the fused material flowing from the mixing chamber, a baffle to deflect material flowing from the mixing chamber toward one side of the puddling chamber, the floor of said puddling chamber being channelled to provide a transverse conduit for said deflected material across said puddling chamber away from said one side to the other side, the floor of said channel sloping from said one puddling chamber side to said other side, the channel being constricted opposite said baffle and continued along said other puddling chamber side lengthwise of the puddling chamber, the floor of this channel portion extending along the puddling chamber sloping toward the bend in the channel from transverse to longitudinal direction, said other puddling chamber side being pierced by a drainage aperture communicating with the lowest portion of said channel at said bend and by a discharge aperture spaced from the drainage aperture and communicating with the channel portion extending lengthwise of the puddling chamber at a point higher than the floor of said channel portion, a replaceable skimming device spanning the channel portion extending lengthwise of the puddling chamber, an erect L-shaped member rising from the floor of the spanned channel portion to support the bottom and rear face of the skimming member, a burner for heating material retained in the top portion of said channel by said skimming member, and an erect shielding member rising from the floor of said puddling chamber to prevent splattering over said channel constriction into the channel portion extending lengthwise of the puddling chamber.

16. An apparatus for continuously supplying homogeneous fused enamel-forming material or the like including a furnace having a fusion chamber provided with a perforate floor and burners for heating material piled on said floor; a mixing chamber having a sloping floor below said fusion chamber adapted to receive fused material drained through said floor and provided with a burner for heating the surface of fused material flowing over said sloping floor; a puddling chamber in material flow communication with said mixing chamber in the direction of slope of the mixing chamber floor and having a crooked conduit for material flow in the puddling chamber floor; a skimming device spanning said conduit for retaining in said puddling chamber the top layer of fused material in said conduit; a burner in said puddling chamber for heating the top layer of fused material in said conduit back of said skimming device; a puddling chamber wall being pierced by an aperture provided with an external spout and communicating with the discharge end of said conduit; and burners disposed about said spout to heat fused material issuing therethrough.

WILLIAM HOGENSON.